(12) United States Patent
Scarborough, III et al.

(10) Patent No.: US 11,371,869 B2
(45) Date of Patent: Jun. 28, 2022

(54) UNITIZED MEASURING ELEMENT FOR WATER METER ASSEMBLY

(71) Applicant: Neptune Technology Group Inc., Tallassee, AL (US)

(72) Inventors: John R. Scarborough, III, Auburn, AL (US); J. Davis Garth, Tallassee, AL (US)

(73) Assignee: NEPTUNE TECHNOLOGY GROUP INC., Tallassee, AL (US)

( * ) Notice: Subject to any disclaimer, the term of this patent is extended or adjusted under 35 U.S.C. 154(b) by 60 days.

(21) Appl. No.: 16/890,116

(22) Filed: Jun. 2, 2020

(65) Prior Publication Data

US 2020/0386591 A1     Dec. 10, 2020

Related U.S. Application Data

(60) Provisional application No. 62/857,549, filed on Jun. 5, 2019.

(51) Int. Cl.
| | |
|---|---|
| *G01F 1/66* | (2022.01) |
| *G01F 1/667* | (2022.01) |
| *G01D 11/24* | (2006.01) |
| *G01F 15/14* | (2006.01) |

(52) U.S. Cl.
CPC ........... *G01F 1/662* (2013.01); *G01D 11/245* (2013.01); *G01F 1/667* (2013.01); *G01F 15/14* (2013.01)

(58) Field of Classification Search
CPC .......... G01F 1/662; G01F 1/667; G01F 15/14; G01N 29/02; G01N 29/222; G01N 29/223; G01N 2291/022; G01D 11/245
See application file for complete search history.

(56) References Cited

U.S. PATENT DOCUMENTS

| | | | |
|---|---|---|---|
| 4,279,167 A | 7/1981 | Erb et al. | |
| 4,435,980 A | 3/1984 | Schmidt | |
| 5,372,047 A | 12/1994 | Russwurm et al. | |
| 6,725,731 B2 | 4/2004 | Wiklund et al. | |

(Continued)

FOREIGN PATENT DOCUMENTS

| | | |
|---|---|---|
| CN | 2881562 Y | 3/2007 |
| CN | 201184801 Y | 1/2009 |
| CN | 201503287 U | 6/2010 |
| CN | 103033224 A | 4/2013 |

(Continued)

*Primary Examiner* — Benjamin R Schmitt
(74) *Attorney, Agent, or Firm* — Snyder, Clark, Lesch & Chung, LLP

(57) ABSTRACT

Systems and methods described herein provide a water meter assembly that includes a main case, which may be permanently situated in-line with a monitored piping system, and an interchangeable measuring element installed within the main case. The measuring element may include solid state ultrasonic components to measure fluid flow through the measuring element. The systems and methods allow for installation and/or replacement of the measuring element (e.g., a field installation) without removal of the main case and without additional calibration. According to an implementation, all measuring components may be included within the measuring element to allow for interchangeability. One measuring element may be swapped out with another measuring element (e.g., a replacement or upgrade) without disconnecting from pipe sections to which the main case is attached.

20 Claims, 11 Drawing Sheets

(56) References Cited

U.S. PATENT DOCUMENTS

| | | | |
|---|---|---|---|
| 6,860,723 B2 | 3/2005 | Chen et al. | |
| 6,895,825 B1* | 5/2005 | Barkhoudarian | G01F 1/662 73/861.28 |
| 7,287,437 B2 | 10/2007 | Kroemer et al. | |
| 7,647,840 B2 | 1/2010 | Rickli | |
| 8,006,570 B2 | 8/2011 | Nazarifar et al. | |
| 8,689,638 B2 | 4/2014 | Shen | |
| 8,783,116 B2 | 7/2014 | Hasunuma | |
| 9,939,303 B2 | 4/2018 | Regen et al. | |
| 10,281,437 B2 | 5/2019 | Leaders et al. | |
| 2003/0097879 A1* | 5/2003 | van Klooster | G01F 1/662 73/861.18 |
| 2011/0016985 A1* | 1/2011 | Stehouwer | G01F 1/667 73/861.27 |
| 2011/0079090 A1* | 4/2011 | Kroemer | G01F 1/662 73/861.25 |
| 2012/0272750 A1* | 11/2012 | Fujii | G01F 1/667 73/861.28 |
| 2013/0008542 A1 | 1/2013 | Irwin et al. | |

FOREIGN PATENT DOCUMENTS

| | | |
|---|---|---|
| CN | 204043821 U | 12/2014 |
| CN | 105157770 A | 12/2015 |
| CN | 105403264 A | 3/2016 |
| CN | 105698883 A | 6/2016 |
| CN | 206362391 U | 7/2017 |
| CN | 206430775 U | 8/2017 |
| CN | 206450271 U | 8/2017 |
| CN | 208458820 U | 2/2019 |
| DE | 102009045620 A1 | 5/2011 |
| EP | 0890826 A1 | 1/1999 |
| EP | 2306160 A1 | 4/2011 |
| EP | 2333495 A1 | 6/2011 |
| EP | 1890115 B1 | 1/2018 |
| EP | 2278281 B1 | 3/2018 |
| GB | 2504297 A | 1/2014 |
| JP | 4467762 B2 | 5/2010 |
| JP | 6216601 B2 | 10/2017 |
| WO | 98179980 A1 | 4/1998 |
| WO | 2018011371 A1 | 1/2018 |
| WO | 2017041990 A1 | 7/2018 |

\* cited by examiner

UNITIZED MEASURING ELEMENT FOR WATER METER ASSEMBLY

CROSS-REFERENCE TO RELATED APPLICATION

This application claims priority under 35 U.S.C. § 119, based on U.S. Provisional Patent Application No. 62/857,549 filed Jun. 5, 2019, titled "Unitized Measuring Element for Water Meter Assembly," the disclosure of which is hereby incorporated by reference.

BACKGROUND OF THE INVENTION

The present application relates generally to water meters and more specifically to water meters that use solid state technology.

Water meters are typically used to measure water usage at a consumption site for billing and/or monitoring purposes. Water meter measurements are directly tied to revenue, which makes measurement integrity and reliability of every water meter a high priority. Solid state ultrasonic water meters generally include no moving parts, which helps to ensure long-term accuracy and reliability. Solid state ultrasonic water meters may be installed in-line with a piping system. In many cases, when a meter needs to be replaced (e.g., due to failure or lifecycle expiration) or be upgraded, the piping system is shut down and the entire in-line water meter segment is removed and replaced.

DETAILED DESCRIPTION

Figure 1:
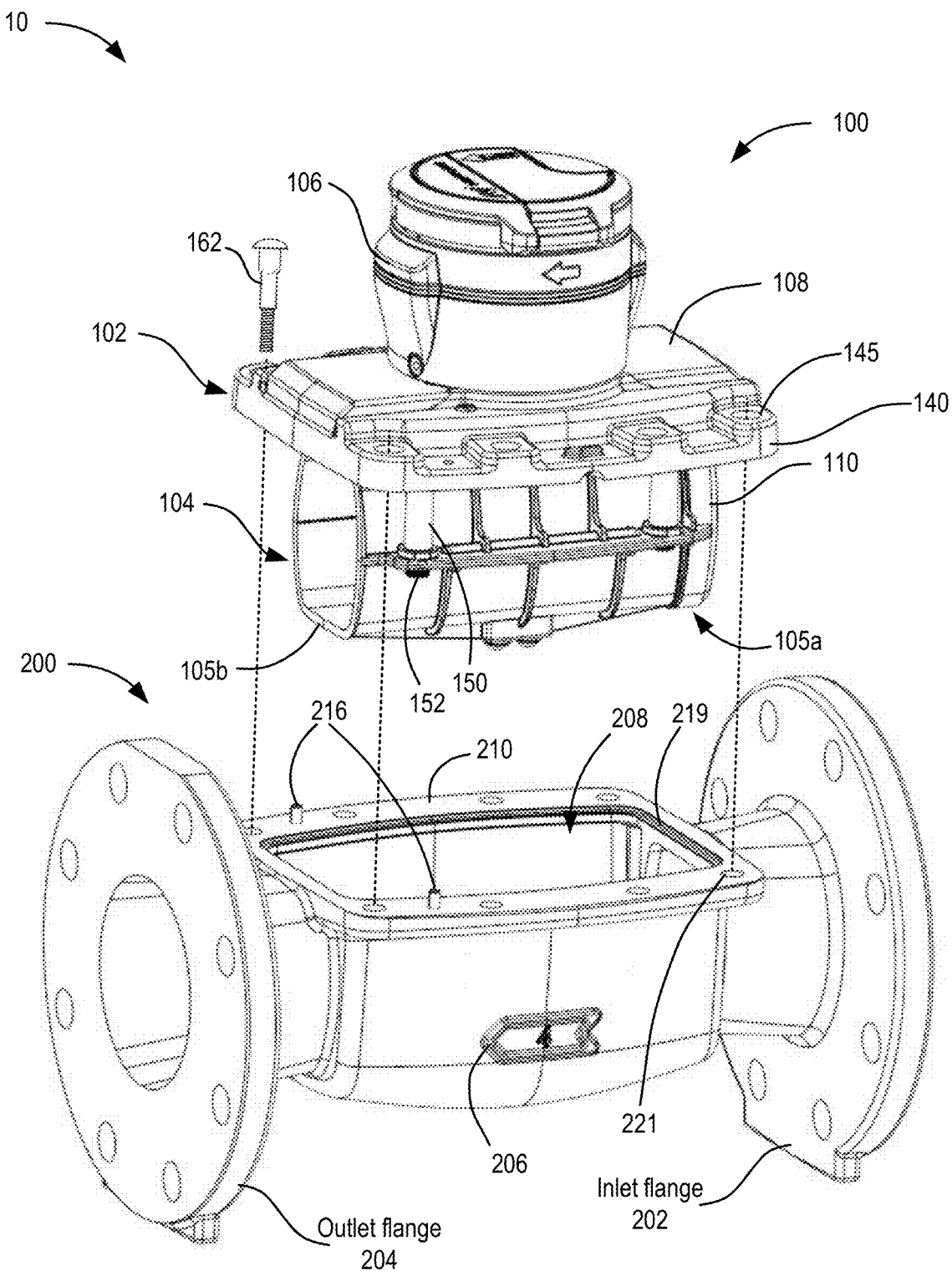
FIG. 1 is a partial assembly view of an embodiment of a water meter assembly, according to an implementation.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

Systems and methods described herein provide a water meter assembly that includes a main case, which may be permanently situated in-line with a monitored piping system, and an interchangeable unitized measuring element (UME) installed within the main case. The UME may include solid state ultrasonic components to measure fluid flow through the UME. The systems and methods described herein allow for installation and/or replacement of the UME without removal of the main case (e.g., for a field installation) and without additional calibration. According to an implementation, all measuring components may be included within the UME to allow for interchangeability. For example, one UME may be swapped out with another UME (e.g., a replacement or upgrade) without disconnecting the main case from pipe sections to which the main case is attached.

According to one embodiment, the main case is a casted metal (e.g., bronze) component with a set of machined interfaces, while the UME includes a measuring channel formed from an engineered polymer (a reinforced engineering thermoplastic, such as Polyphenylene Ether (PPE) or Polyphenylene Oxide (PPO)). The main case includes an inlet section that transitions from a substantially circular or oval-shaped cross-section (matching the system piping) to a substantially rectangular cross-section that can provide for more accurate flow measurements. One machined interface of the main case transitions between the inlet side of the main case and the entry point of the measuring channel, while another machined interface provides a sealing ridge into which a gasket can be mounted to receive the UME in a precise and fluid-tight orientation. The machined surfaces allow for interchangeability between different UMEs and main cases. More particularly, the machined surfaces enable precision alignment that provides a leak-free metal-to-polymer interface, reduces pressure loss, and reduces turbulence in the measuring channel for interchangeable components.

According to another embodiment, the UME includes features to eliminate trapped air that may otherwise occur during insertion of the UME into the main case. In one aspect, the cover of the UME channels otherwise-entrapped air to a vent or bleed screw located at a high or upper point in the cover. In another aspect, ultrasonic transducers are installed in the cover of the UME external to the fluid flow through the measuring channel. An air gap may be provided between the face of each transducer and the fluid path. The gap prevents air bubbles in the water from resting on the face of the transducers.

According to still another embodiment, at least two pairs of transducers are mounted in the cover of the UME, above the measuring channel. A metal reflector plate may be mounted at the bottom of the measuring channel to reflect ultrasonic signals between the transducers in a V-shaped measuring path. The two pairs of transducers are aligned to create two parallel measuring paths at different places along the width of the measuring channel. The arrangement of the transducers and reflector plate within the UME allows for factory calibration of the UME and subsequent field installation without additional calibration.

FIG. 1 is a partial assembly view of an embodiment of a water meter assembly 10. As shown in FIG. 1, water meter assembly 10 includes a UME 100 that may be inserted into a main case 200. UME 100 includes a cover 102 that supports a measuring channel 104, an electronics module 106, and a transducer cover 108. Main case 200 may be dimensioned to fit inline within a selected pipe system (e.g., a particular pipe diameter). Inlet flange 202 may be bolted, for example, to a corresponding flange (not show) of the piping system, and outlet flange 204 be bolted, for example, to another corresponding flange (not show) of the piping system, such that water flows through main case 200 in a desired flow direction, shown as arrow 206. Main case 200 may be configured with a cavity 208 into which a portion of UME 100 may be inserted.

Figure 2:
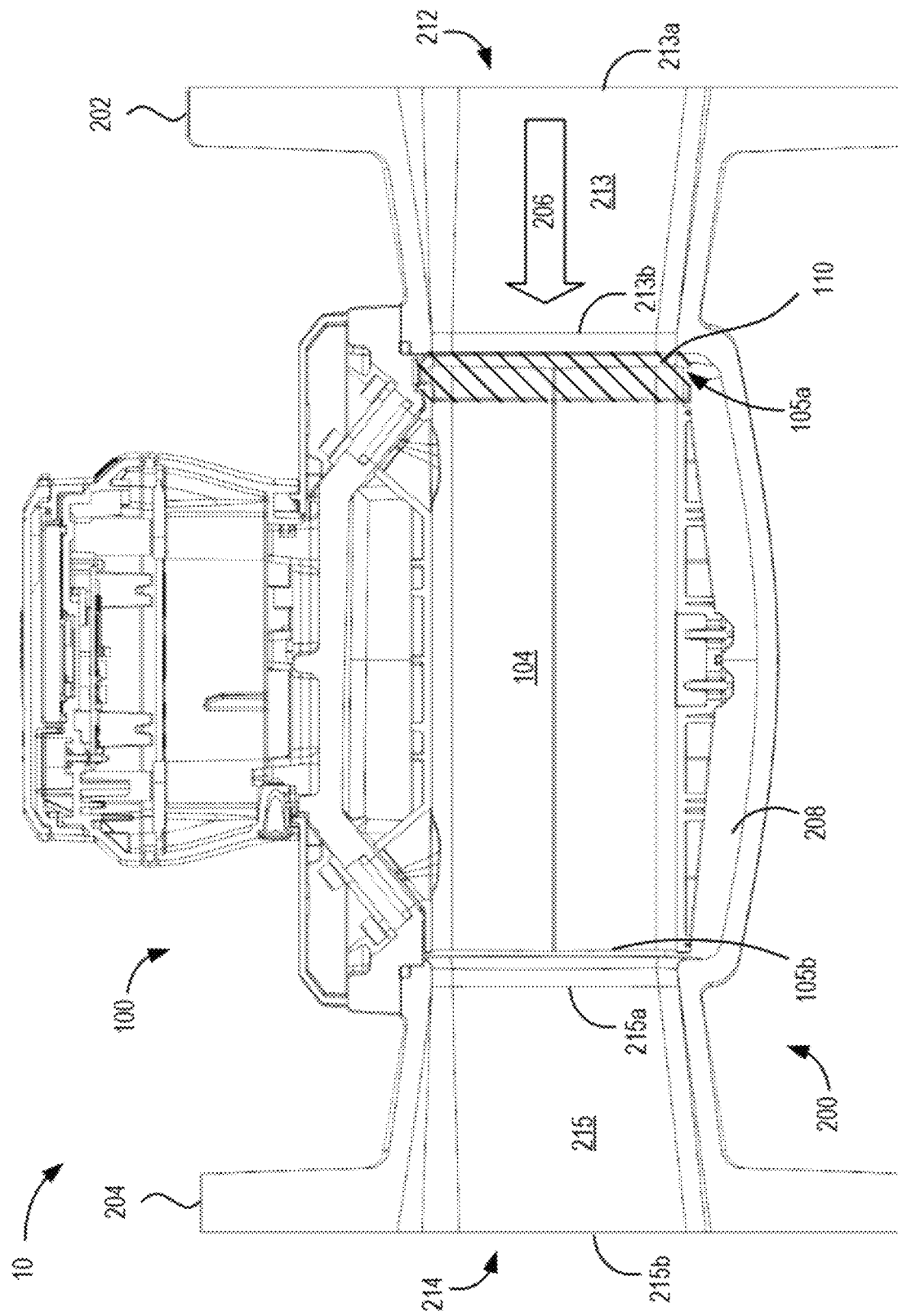
FIG. 2 is a longitudinal cross-sectional view of the assembled water meter assembly of FIG. 1.

As shown, for example, in FIG. 2, an entry section 212 extends from input flange 202 into cavity 208. Similarly, an exit section 214 extends from an opposite side of cavity 208 to outlet flange 204. Entry section 212 and exit section 214 adjust the cross-sectional shape (i.e., orthogonal to the general flow direction) of the water flow path to permit accurate measurement by UME 100. Entry section 212 provides a channel 213 that gradually transitions a flow path from a circular cross-section at 213a (e.g., corresponding to a shape of the system inlet piping) to a substantially rectangular cross-section 213b that matches an inlet end 105a of measuring channel 104, as described further herein. According to one implementation, the area ratio of the substantially rectangular cross-section 213b to the substantially circular cross-section 213a may be about 0.4 to 0.8. Exit section 214 provides a channel 215 that gradually transitions the flow path from the substantially rectangular cross-section 215a that matches an outlet end 105b of measuring channel 104 to return to a circular cross section 215b. The design of the gradual transition in channel 213 may reduce pressure loss through measuring channel 104.

When inserted within cavity 208, measuring channel 104 is aligned with entry section 212 and exit section 214 (e.g., FIG. 2) such that water/fluid from the monitored piping system flows into entry section 212, through measuring channel 104, and out exit section 214. Precision alignment of measuring channel 104 and entry section 212 (along with a seal ring 110, described below) prevents leakage past measuring channel 104 and to permit consistent and accurate measurements by UME 100. In one aspect, the combination of design, material selections and manufacturing processes described herein allow this precision alignment to be achieved, which allows for interchangeability of different UMEs 100 and main cases 200 without calibration.

According to an implementation, main case 200 may be a cast component (e.g., bronze, stainless steel, etc.). Cover 102 may also be a cast component of the same or similar material. Alternatively, cover 102 may be made of a different material, such as a composite, thermoplastic, etc. Measuring channel 104 may be formed from an engineered polymer material, such as structurally rigid hard plastic material that can be injection molded. Measuring channel 104 may be formed, for example, as two halves that are secured together and bolted to the underside of cover 102. Using the injection molded measuring channel 104 may allow for tighter tolerances and more consistent cross-sectional flow path through measuring channel 104 (e.g., compared to those achieve with metal castings) to provide for consistent performance and interchangeability of different UMEs 100 with main case 200. For example, typical sand casting tolerances are in the range of 0.030-0.200 inches, whereas typical tolerances for injection molding processes are in the range of 0.003-0.030 inches. According to another implementation, the plastic material of measuring channel 104 may reduce the possibility of build-up of foreign material (e.g., lime) over the lifetime UME 100. According to an implementation, the material forming measuring channel 104 may include PPE and high impact polystyrene (HIPS) reinforced with glass.

Referring to FIG. 2, a seal ring 110 may be affixed to the inlet end 105a of measuring channel 104, encircling the perimeter at inlet end 105a. Seal ring 110 may include a flexible material, such as a thermoplastic elastomer (TPE), to provide a face seal between measuring channel 104 and entry section 212. In another implementation, seal ring 110 may be formed of any suitable resilient material, such as a combination of polypropylene and ethylene-propylene-diene-monomer (EPDM), silicone, etc. When measuring channel 104 is inserted into cavity 208, seal ring 110 is pressed against the periphery of entry section 212 and prevents leaking of water outside of measuring channel 104 at the interface between measuring channel 104 and entry section 212. Seal ring 110 allows for greater dimensional variance between different UME 100 assemblies to facilitate better interchangeability with main case 200. Additionally, or alternatively, seal ring 110 may be used at outlet end 105b of measuring channel 104. In still other implementations, UME 100 and main case 200 may be configured to interface without seal ring 110.

Figure 3:
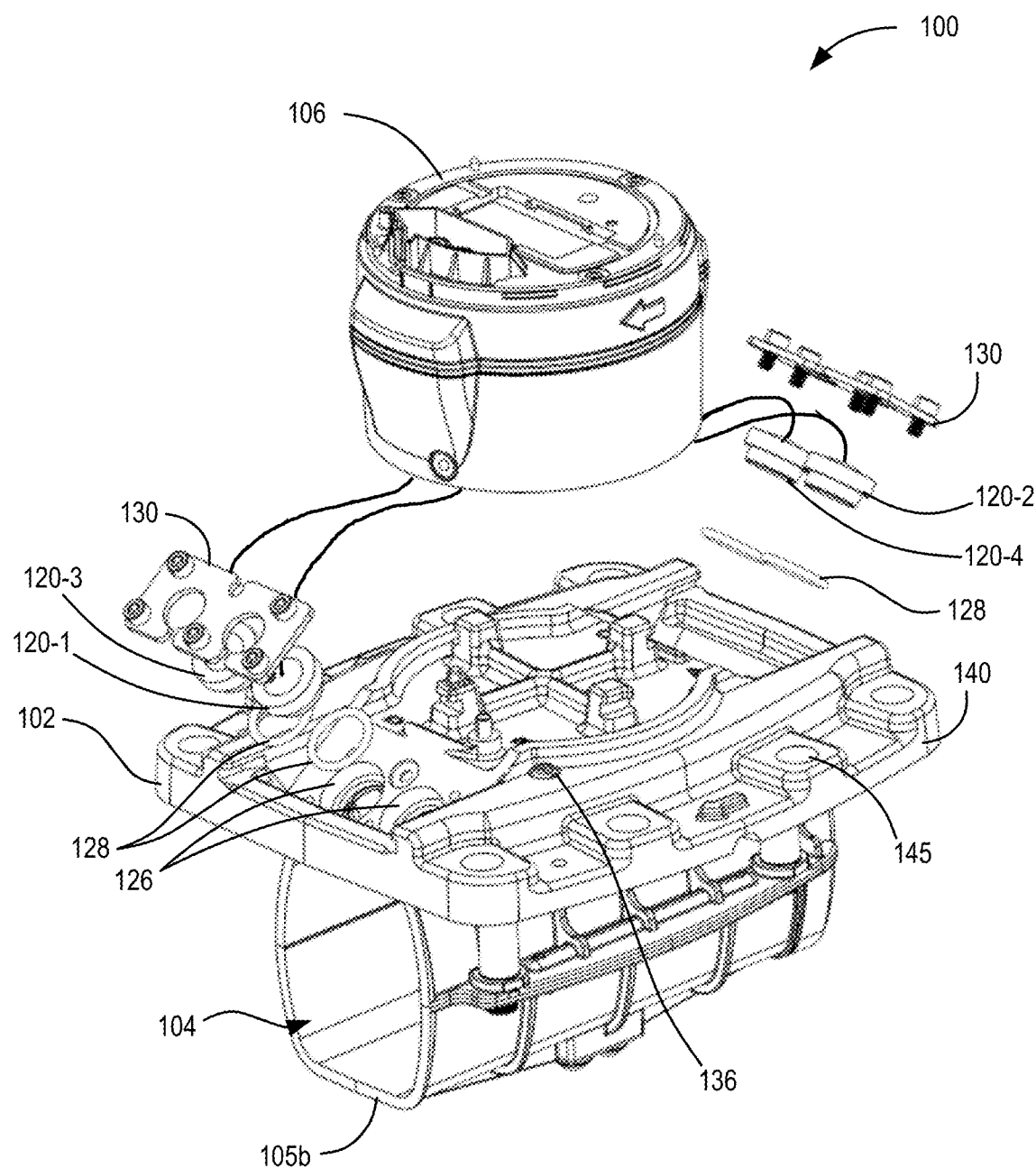
FIG. 3 is a partial assembly view of the unitized measuring element (UME) of FIG. 1.
Figure 4:
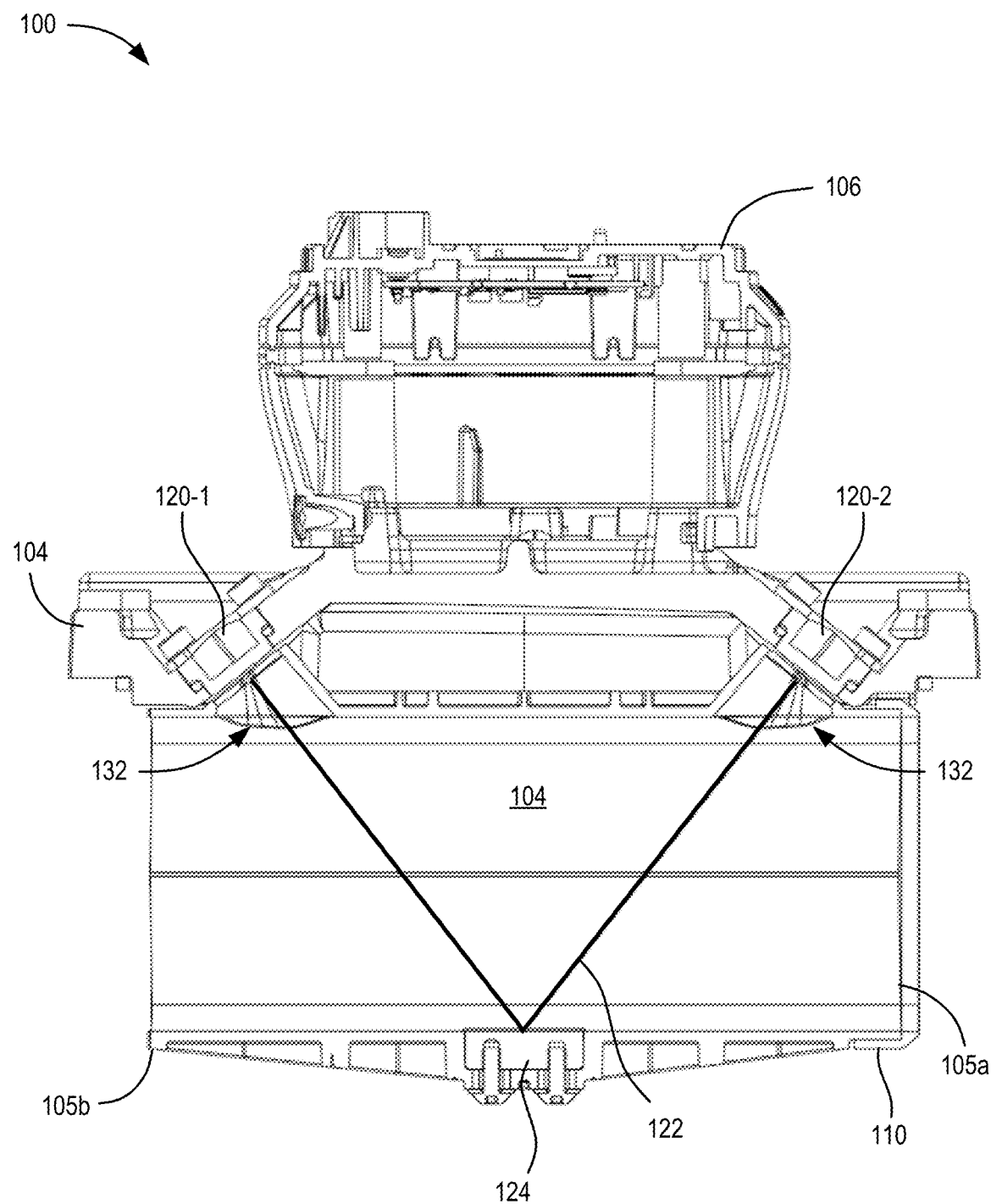
FIG. 4 is a longitudinal cross-sectional view of the UME of FIG. 1.

FIG. 3 is a partial assembly view of UME 100, including cover 102, measuring channel 104, and electronics module 106 (cover 108 is not shown). Electronics module 106 may include or be connected to ultrasonic transducers 120-1 through 120-4 (referred to collectively as "transducers 120" or generically as "transducer 120"). According to an embodiment, two transducers 120 on opposite ends of the flow path (e.g., inlet end and exit end) form a pair. Thus, transducers 120-1 and 120-2 form one transducer pair and transducers 120-3 and 120-4 form another transducer pair. Each transducer 120 is directed to emit ultrasonic waves that reflect off an acoustic reflecting plate 124 (FIG. 4), mounted at the bottom (and outside the flow path) of measuring channel 104, and receive the reflected signal of the paired transducer 120. Thus, each of ultrasonic transducers 120 directs an ultrasonic signal from a same side (e.g., the top side) of measuring channel 104 toward reflecting plate 124 on an opposite side (e.g., the bottom side) of measuring channel 104.

Generally, to measure flow velocity, electronics module 106 may send a signal from an upstream transducer to a downstream transducer (e.g., from transducer 120-2 to transducer 120-1) and measure the time of flight of the signal to reach the downstream transducer. Electronics module 106 may then send a signal in the reverse direction (e.g., from transducer 120-1 to transducer 120-2) and measure the time of flight of the signal to reach the upstream transducer. The difference in travel times between the upstream and downstream signals may be used to determine the flow rate. As shown in the longitudinal cross-section view of FIG. 4, each transducer 120 pair creates a V-shaped parallel measurement path 122. The V-shaped measurement path permits mounting of all transducers 120 within cover 102 while minimizing the number of reflector plates 124 used in measuring channel 104. Furthermore, in contrast with conventional reflectors that are mounted on the main case, reflector plate 124 is located within UME 100, to facilitate better interchangeability with different main cases 200 and UMEs 100. Locating reflector plates 124 in the molded measuring channel 104 provides better locational tolerance than attaching it to a cast main case or machined pocket in the main case. The consistent dimension also aids in interchangeability.

Flow rates may be detected using the dual measurement paths 122. Electronics module 106 may include, for example, a battery, a temperature sensor, a processor, and a memory to store instructions. The instructions (e.g., software) may be used to interpret signals from transducers 120 and compute, for example, volume flow rate and total volume through measuring channel 104. Electronics module 106 may combine measurements from the two measurement paths 122 (i.e., between the path from transducers 120-2 to 120-1 and the path from transducers 120-4 to 120-3) in a manner to improve the flow measurement accuracy. For example, two simultaneous measurements may be used along different measurement paths 122 to account for asymmetry in the flow path through measuring channel 104. Potential non-uniformity of flow velocity within measuring channel 104 is mitigated by the use of dual measurement paths 122. Calculating the average measurement from dual paths 122, for example, may reduce measurement error. According to one implementation, electronics module 106 may provide near-simultaneous measurement of fluid velocity or flow rate that provides a more representative estimate of the average velocity than a single direct measurement.

Cover 102 may include individual mounting holes 126 into which a gasket 128 and one of transducers 120 may be inserted. Mounting holes 126 may align with ports 132 in measuring channel 104 to permit acoustic signals from transducers 120 to enter and exit measuring channel 104. A plate 130 may be placed over transducers 120 and attached to cover 102 to secure transducers in mounting holes 126. In one implementation, one plate 130 may be secured over transducers 120 on each side (e.g., transducers 120-1 and 120-3 under one plate 130, and transducers 120-2 and 120-4 under another plate 130). The location of mounting holes 126 on cover 102 and ports 132 on measuring channel 104 allow for top-mounting of transducers 120, which permits simplified assembly from outside UME 100. The angle of mounting holes 126 and ports 132 also enables use of standard (e.g., non-wedge) transducers 120, while still providing angled measurement paths 122. Furthermore the location of ports 132 positions all of transducers 120 near the rest of electronics module 106 so that transducers 120 can more easily be part of a potted electronics assembly. Thus, in an exemplary embodiment, UME 100 can be assembled with top mounted transducers 120 installed in a dual measurement path configuration and sealed against water intrusion (or potted) as a separate component from main case 200.

Figure 5:
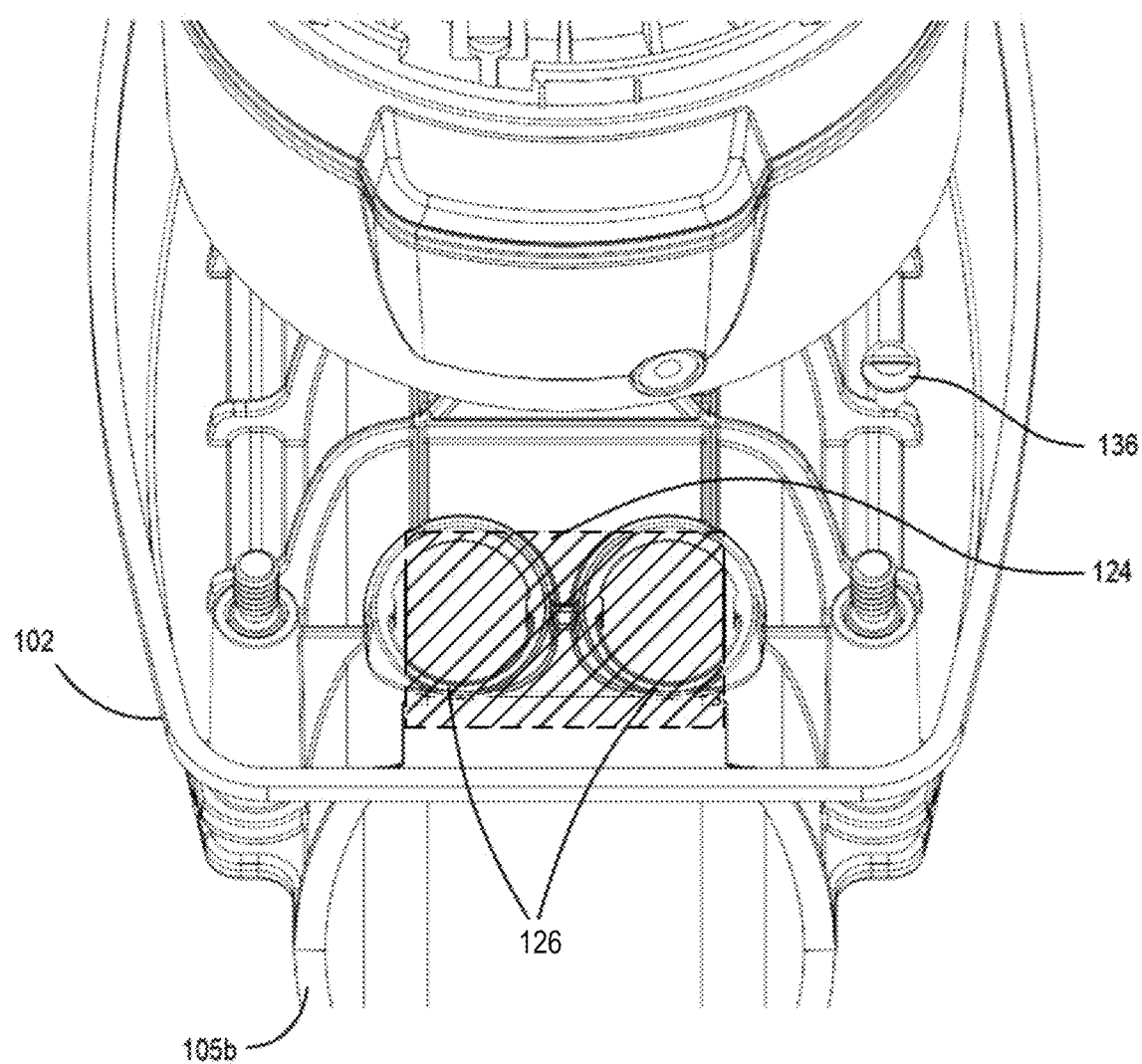
FIG. 5 is an end perspective view of a partially assembled portion of the UME of FIG. 1.

FIG. 5 is an end perspective view of a partially assembled portion of UME 100. In FIG. 5, measuring channel 104 is attached to cover 102, but without transducers 120-1 and 120-3, plate 130, or transducer cover 108 installed. The perspective of FIG. 5 looks through ports 126 above outlet end 105*b* along a portion of dual measurement paths 122. Both ports 126 are angled to direct parallel ultrasonic signals from transducers 120 (e.g., transducers 120-1 and 120-3) toward reflector plate 124 and/or receive parallel ultrasonic signals that originate from transducers 120 (e.g., transducers 120-2 and 120-4) and reflect off reflector plate 124.

Figure 6A:
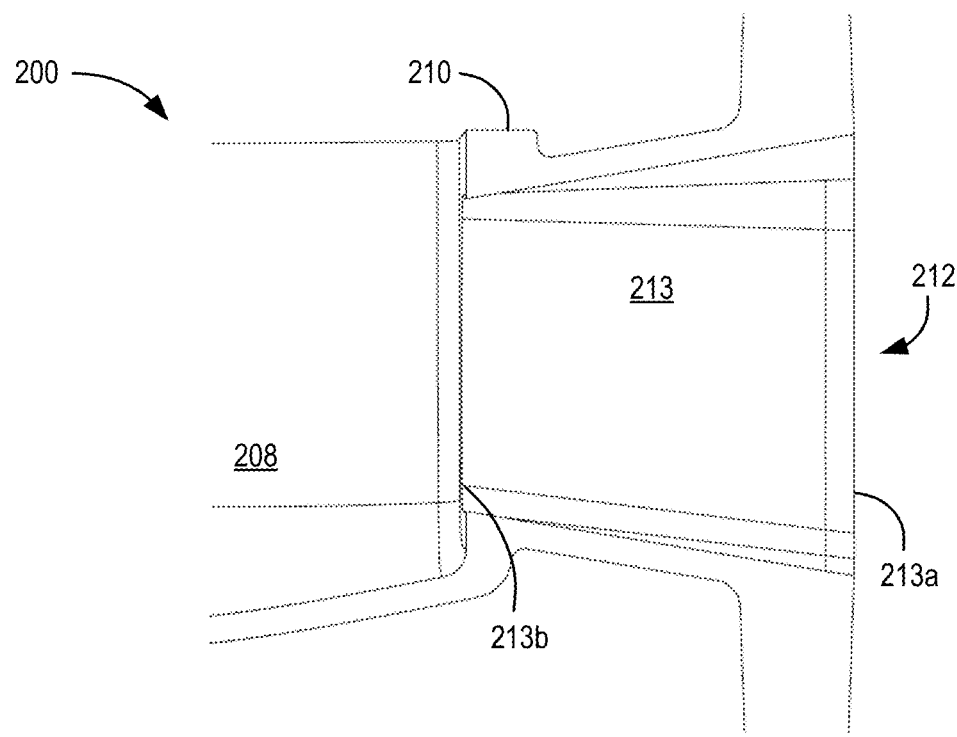
FIGS. 6A and 6B are cross-sectional side views of a portion of the main case of FIG. 1.
Figure 6B:
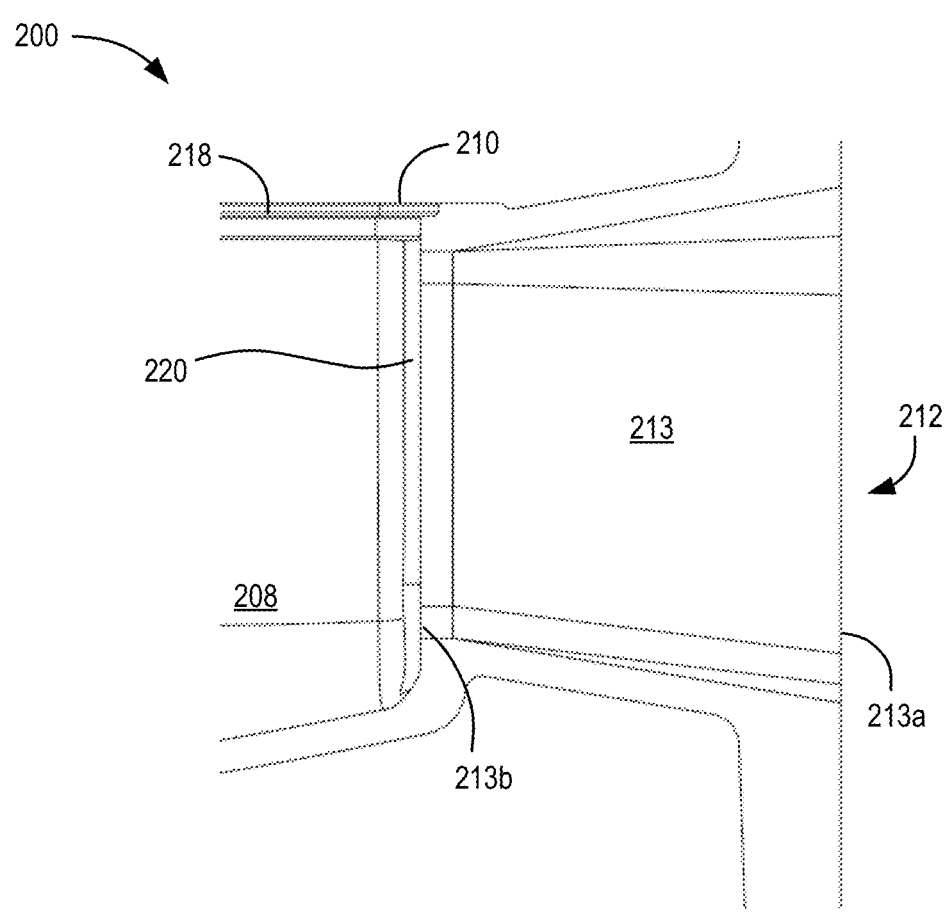
Figure 7:
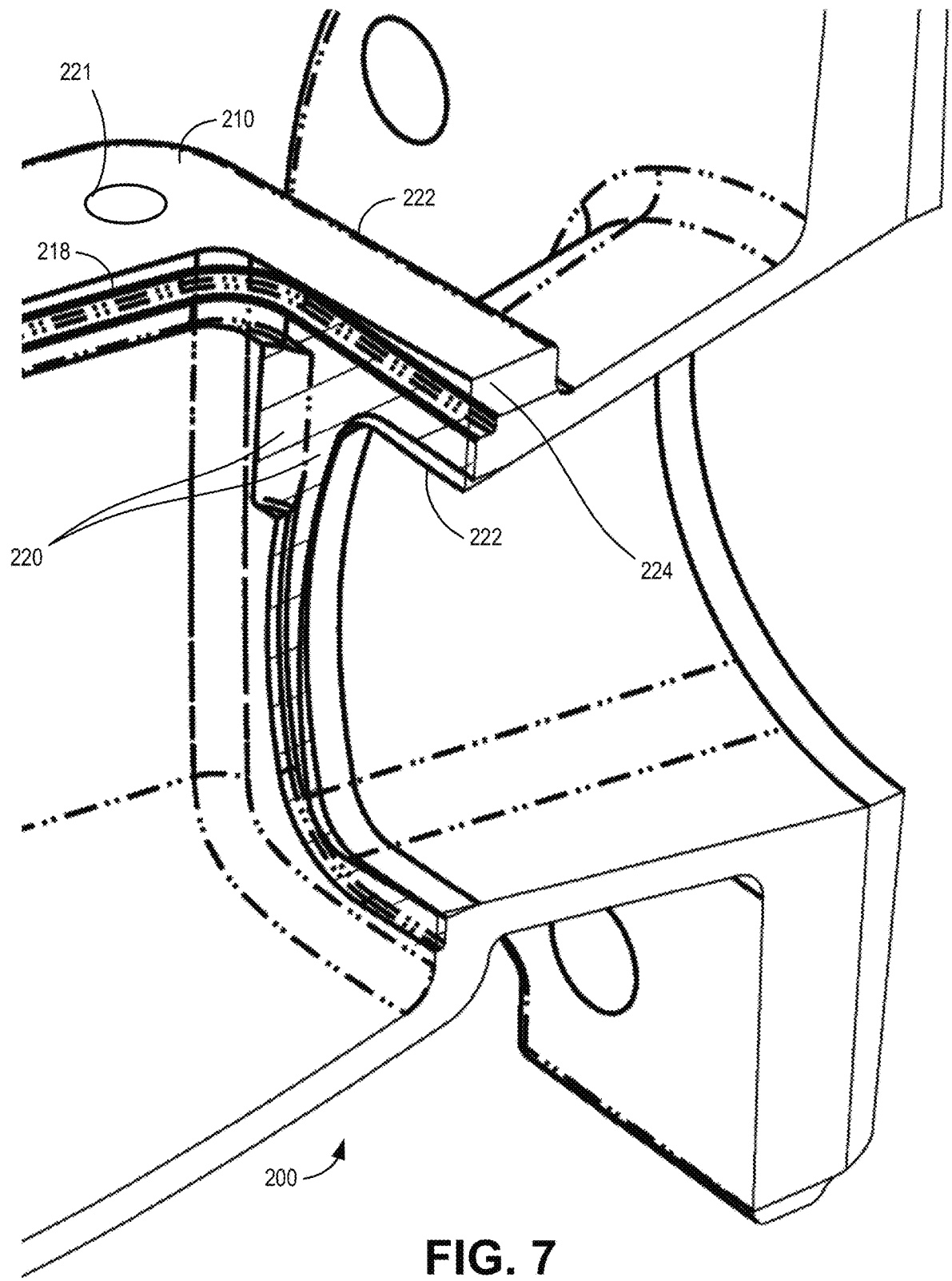
FIG. 7 is an enlarged cutaway view of machined portions of the main case of FIG. 1.

FIGS. 6A and 6B are cross-sectional side views of a portion of main case 200 with inlet section 212. FIG. 6A shows the portion of main case 200 in an as-cast condition. FIG. 6B shows the portion of main case 200 after machining. FIG. 7 shows an enlarged cutaway view of machined portions of main case 200. As a cast component main case 200, and particularly surfaces forming cavity 208 and channel 213, may include rough, inconsistent surfaces which are a typical characteristic of sand castings. Such surface inconsistencies could preclude alignment of measuring channel 104 with entry section 212. According to an implementation, main case 200 is cast with excess material along mounting flange 210 and the end of channel 213 (e.g., at the area of substantially rectangular cross-section 213*b*). As described further herein, the excess material from the cast main case 200 is machined to precise desired dimensions/geometry to interface with UME 100.

Figure 8:
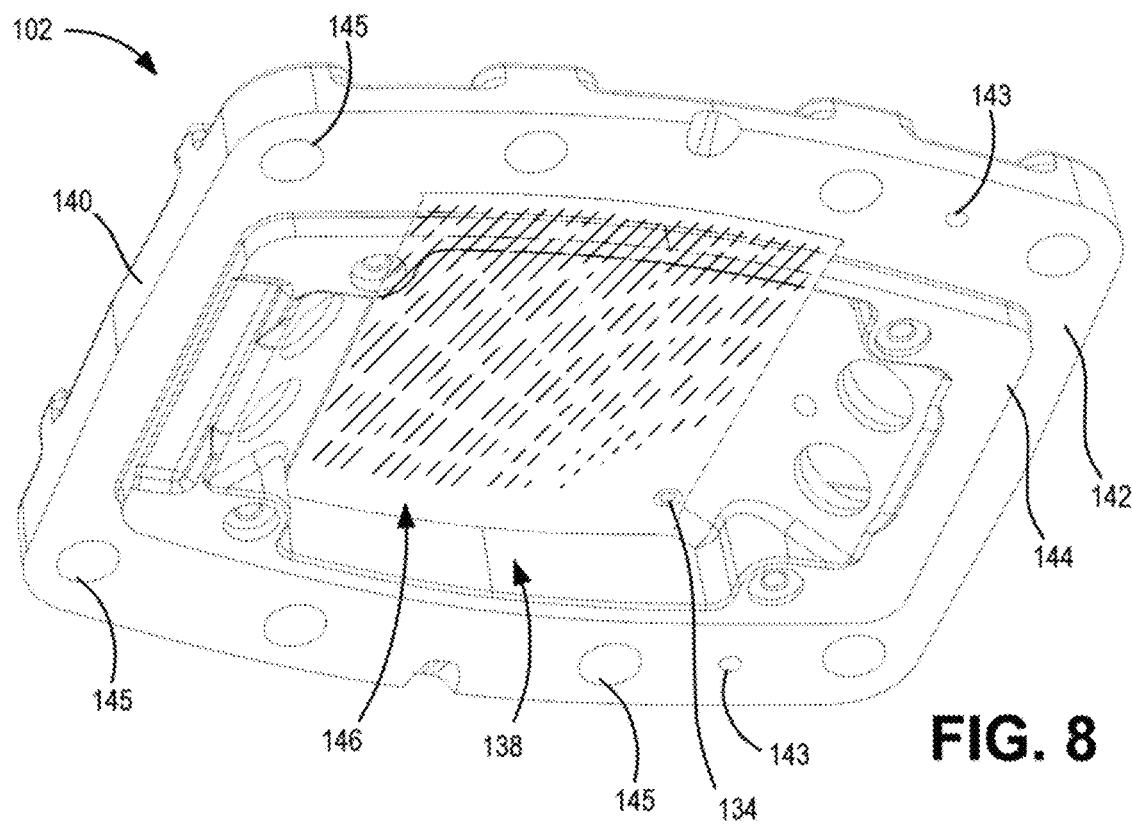
FIG. 8 is a perspective bottom view of the cover of FIG. 1.

FIG. 8 is a perspective view of the bottom of cover 102. As shown in FIG. 8, cover 102 may include a flange 140 that mates to mounting flange 210 of main case 200. Flange 140 may include a planar, smooth mating surface 142 and a projecting surface 144 that extends past mating surface 142 (i.e., protruding below surface 142 in the orientation of FIG. 8). According to an implementation, mating surface 142 and projecting surface 144 may be machined to small tolerances to enable simple alignment with main case 200.

As shown in FIGS. 6B and 7, mounting flange 210 may be machined to form a generally smooth mating surface to mate with the underside of cover 102. A ridge 218 may be machined along an inside edge of mounting flange 210. Ridge 218 may be configured to receive a seal/gasket 219 (FIG. 1) that mates to projecting surface 144 of cover 102 to form a fluid-tight seal between UME 100 and main case 200. Furthermore, additional machining of main case 200 may be performed to provide smooth, planar, precisely-shaped surfaces 220 at the interface of cavity 208 and channel 213. Surfaces 220 may abut seal ring 110 to form a fluid-tight seal when measuring channel 104 is inserted into cavity 208. FIG. 7 shows a phantom 222 of the as-cast main case 200 over some of the machined portions of main case 200, including ridge 218 and surfaces 220. As overlaid on the machined portions of main case 200, phantom indicates where excess material 224 from the as-cast main case 200 is removed by machining.

To assemble meter assembly 10, UME 100 may be inserted into cavity 208 of main case 200. Guide holes 143 in flange 140 may receive alignment pins 216 extending from flange 210 to assist with alignment and orientation of UME 100. When properly aligned, projecting surface 144 may set against gasket 219 within ridge 218, and mating surface 142 may mate flush with flange 210. Holes 145 of flange 140 align with holes 221 of flange 210. Fasteners (e.g., bolts 162, washers, nuts, etc., not shown) may be inserted through holes 145 and holes 221 to secure UME 100 to main case 200.

Figure 9:
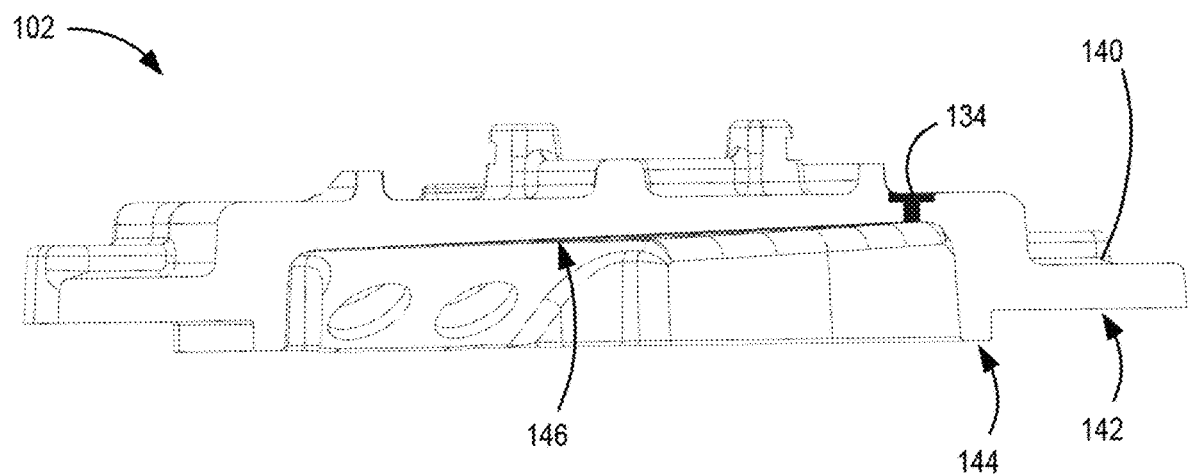
FIG. 9 is a side cross-sectional view of the cover of FIG. 1.

According to an implementation, UME 100 may be swapped out of main case 200 as a field installation. For example, after turning off a waterflow, an old UME 100 may be replaced with a new UME 100 on site (e.g., without disconnecting main case 200 from the measured piping system). During insertion of UME 100 into cavity 208, entrapment of air is possible due, in part, to the small tolerances and sealed surfaces. Entrapped air (e.g., air bubbles) in the vicinity of transducers 120, for example, can interfere with the acoustic impedance for the monitored fluid and reduce accuracy of UME 100. As shown in FIGS. 3, 8, and 9, a bleed hole 134 and bleed screw 136 may be included in cover 102 to release entrapped air (such as air trapped during insertion of measuring channel 104 into cavity 208. Bleed hole 134 may be positioned at a high point of cavity 138 within the underside of cover 102. As illustrated in FIGS. 8 and 9, the dimensions of measuring channel 104 and cavity 138 are configured such that, when UME 100 is installed, a gap exists between cover 102 and measuring channel 104 so that cavity 138 directs air to bleed hole 134 along a gently sloping surface 146. Bleed screw 136 may be adjusted to release/remove air through bleed hole 134.

Figure 10:
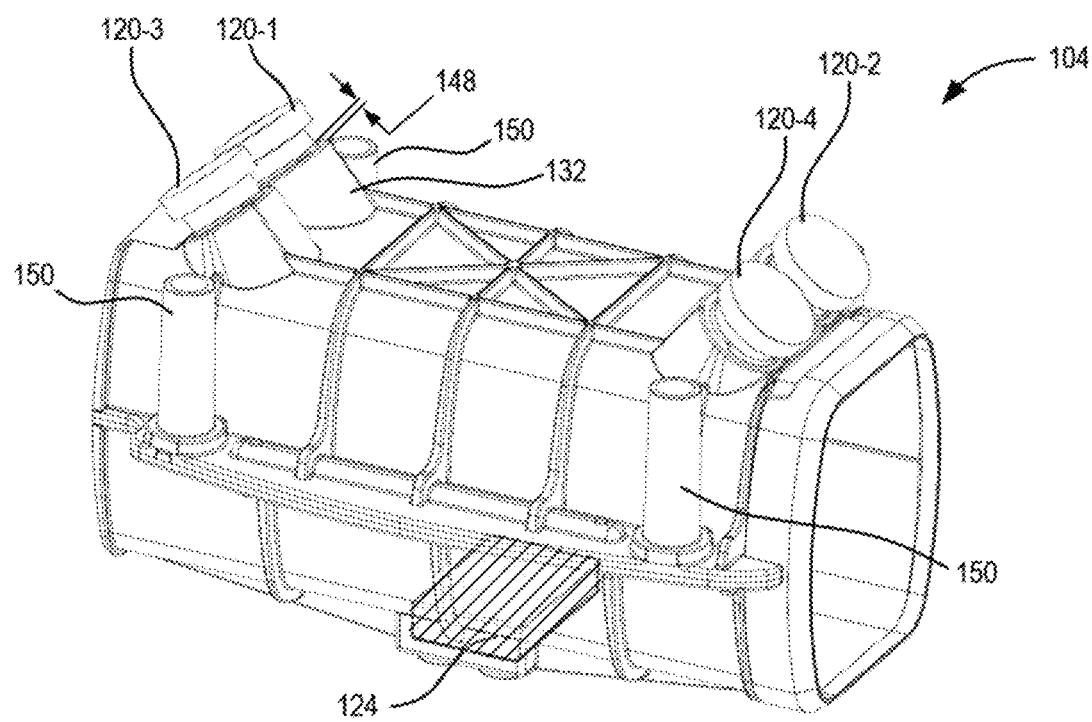
FIG. 10 is a perspective view of the measuring channel of FIG. 1 with a reflector plate and transducers.

FIG. 10 is a perspective view of measuring channel 104 with reflector plate 124 installed and transducers 120 aligned with respective ports 132. When assembled, transducers 120 sit in mounting holes 126 and are supported by cover 102 without contacting ports 132/measuring channel 104. An air gap 148 separates each transducer 120 from each port 132. The spacing between the top of measuring channel 104 and the bottom of cover 102 (and thus the dimension of air gap 148) is governed in part by the length of bolt guides 150. For example, bolts/screws 152 (FIG. 1) may be inserted through the bottom of bolt guides 150 and threaded into cover 102 to secure measuring channel 104 to cover 102 with desired spacing. According to one non-limiting example, air gap 148 may be about 0.05 inches.

Figure 11:
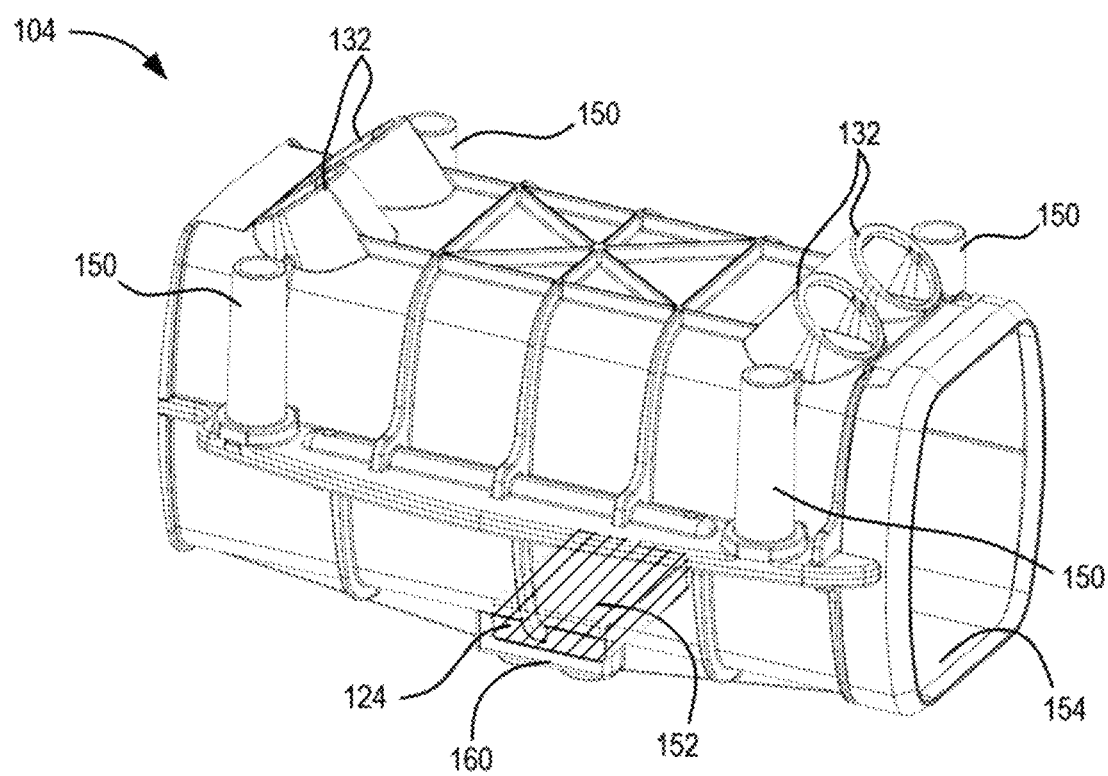
FIG. 11 is a perspective top view of the measuring channel of FIG. 1 with the reflector plate installed.
Figure 12:
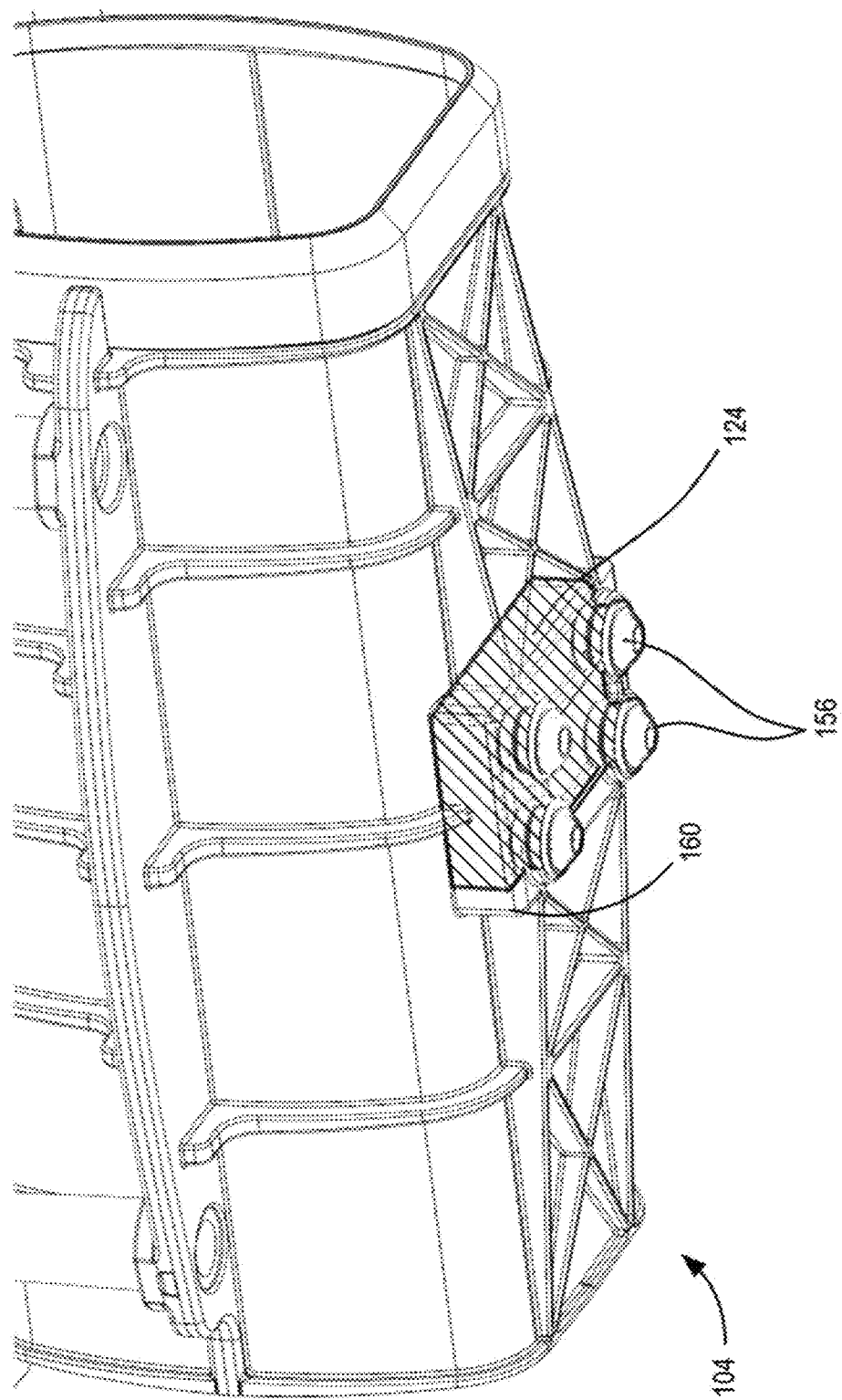
FIG. 12 is a partial bottom perspective view of the measuring channel of FIG. 1 with the reflector plate installed.

FIG. 11 is a perspective top view of measuring channel 104 with reflector plate 124 installed. FIG. 12 is a partial perspective bottom view of measuring channel 104 with reflector plate 124 installed. As shown in FIGS. 11 and 12, reflector plate 124 may be secured within a pocket 160 below a lower interior surface 154 of measuring channel 104. As noted above, the location of pocket 160 is configured to position reflector plate 124 for enabling V-shaped parallel measurement path 122 between transducer 120 pairs. In one implementation, reflector plate 124 may be secured within measuring channel 104 such that a top surface 152 of reflector plate 124 is substantially flush with lower interior surface 154 so as to not disrupt the flow path of fluid through measuring channel 104. Reflector plate 124 may include a material with high acoustic reflectivity, such as steel or stainless steel. In one implementation, reflector plate 124 may be secured in pocket 160 using screws 156. In other implementations, reflector plate 124 may be held in place via an interference fit, clips, adhesives, or another type of fastener.

Figure 13:
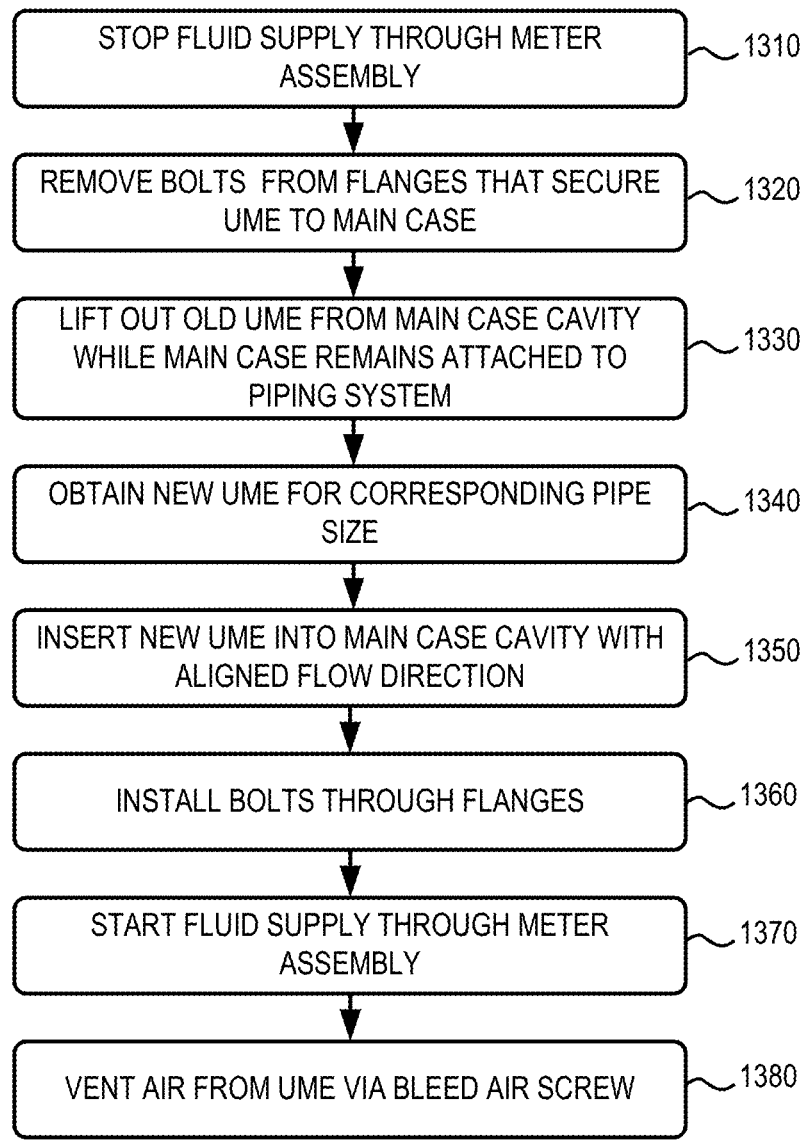
FIG. 13 is a flow diagram illustrating an exemplary process for performing a field installation of the UME of FIG. 1, according to an implementation described herein.

FIG. 13 is a flow diagram for a process 1300 for performing a field installation of a UME for a water meter assembly, such as any of the embodiments described above. Process 1300 may include stopping a fluid supply through a meter assembly (block 1310) and removing bolts from flanges that secure the UME to the main case (block 1320). For example, a technician may turn off a water supply for a piping system that includes water meter assembly 10. With the water supply stopped/turned off, pressure in the system (e.g., including water meter assembly 10) may be relieved, and then the technician may remove bolts (e.g., bolts 162) that secure flange 140 of UME 100 to flange 210 of main case 200.

Process 1300 may include lifting the old UME out from the main case cavity, while the main case remains connected to the piping system (block 1330). For example, with the bolts removed, a technician may extract UME 100 from main case 200.

Process 1300 may further include obtaining a new UME for the corresponding pipe size (block 1340) and inserting the new UME into the main case cavity in the aligned flow direction (block 1350). For example, a technician may select a new UME 100 (e.g., a replacement UME 100, an upgraded UME 100, etc.) that is configured for the size of the piping system. The new UME 100 may be inserted so that measuring channel 104 is inserted into cavity 208 with seal ring 110 pressing against entry section 212. The orientation and alignment of the new UME 100 in main case 200 is assured, for example, when guide holes 143 in flange 140 are inserted over alignment pins 216 and projecting surface 144 is received onto seal 219 within ridge 218.

Process 1300 may additionally include installing the bolts through the flanges (block 1360), and starting the fluid supply through the meter assembly (block 1370). For example, bolts 162 may be installed to secure flange 140 of the new UME 100 to flange 210 of main case 200. Once the bolts are secured, the water supply for the piping system may be turned on, allowing for flow through water meter assembly 10.

Process 1300 may also include venting air from the UME via a bleed air screw (block 1380). For example, fluid flow through measuring channel 104 may force air into cavity 138 of cover 102. Bleed screw 136 may be adjusted to release/remove the air through bleed hole 134. Thus, using process 1300, a new UME 100 may be inserted into a previously installed main case 200 without the need for additional alignment or calibration.

According to an implementation, a water meter assembly is provided. The water meter assembly includes a unitized measuring element and a main case. The unitized measuring element includes a cover, a measuring channel secured to the cover, an electronics module, a seal ring secured to an inlet end of the measuring channel, and an acoustic reflector plate mounted on a second side of the measuring channel, wherein the acoustic reflector plate redirects the ultrasonic signals from the two pairs of ultrasonic transducers. The electronics module includes (a) at least two pairs of ultrasonic transducers for measuring a flow of a fluid flowing through the measuring channel and (b) a processor to calculate an average flow value from the two pairs of ultrasonic transducers, wherein each of the ultrasonic transducers direct an ultrasonic signal from a same first (e.g., top) side of the measuring channel. The main case includes a cavity to receive at least a portion of the unitized measuring element, a flange surrounding a top of the cavity, the flange being configured to support the cover, and an entry section that gradually transitions an inlet flow path from a circular cross section to a substantially rectangular cross-section.

According to another implementation, a unitized measuring element is provided. The unitized measuring element includes a cover including a first material; a measuring channel including a second material that is different than the first material; an electronics module including (a) at last two pairs of ultrasonic transducers for measuring a flow of a fluid flowing through the measuring channel and (b) a processor to calculate an average flow value from the two pairs of ultrasonic transducers, wherein each of the ultrasonic transducers direct an ultrasonic signal from a same first (e.g., top) side of the measuring channel; a seal ring secured to an inlet end of the measuring channel; and an acoustic reflector plate mounted on a second side of the measuring channel, wherein the acoustic reflector plate redirects the ultrasonic signals from the two pairs of ultrasonic transducers. The unitized measuring element is removably attached to a main casing that is connected to a piping system.

According to still another implementation, a water meter assembly includes a unitized measuring element and a main case. The metering assembly, includes a measuring element that has a cover, a measuring channel coupled to the cover, an electronics module, a seal ring secured to an inlet end of the measuring channel, and an acoustic reflector plate. The electronics module includes at least one pair of ultrasonic transducers for measuring a flow of a fluid flowing through the measuring channel, and a processor to calculate a flow value from the pair of ultrasonic transducers, wherein each of the ultrasonic transducers is configured to transmit an ultrasonic signal into the measuring channel. The acoustic reflector plate reflects the ultrasonic signals from the pair of ultrasonic transducers in V-shaped parallel measurement paths between each of the at least two transducer pairs. The main case includes a cavity to receive at least a portion of the measuring element, a flange surrounding a top of the cavity and configured to support the cover, and an entry section that transitions an inlet flow path from a substantially circular cross-section to a substantially rectangular cross-section. The entry section further has a machined surface adjacent the substantially rectangular cross-section and facing the cavity, wherein the seal ring is configured to press against the machined surface to form a fluid-tight seal.

According to yet another embodiment, the metering assembly includes a measuring element with a cover, a measuring channel coupled to the cover, an electronics module, and an acoustic reflector plate. The electronics module includes at least two pairs of ultrasonic transducers for measuring a flow of a fluid flowing through the measuring channel, and a processor to calculate a flow value from the at least two pair of ultrasonic transducers, wherein each of the ultrasonic transducers is configured to transmit an ultrasonic signal into the measuring channel from above the measuring channel. The acoustic reflector plate reflects the ultrasonic signals from the pair of ultrasonic transducers. The metering assembly also includes a main case with an entry section, an exit section, and a cavity in between the entry section and the exit section. The cavity may be configured to receive the measuring channel in-line with the entry section and the exit section. The main case also includes a flange surrounding a top of the cavity, the flange being configured to support the cover. The entry section transitions an inlet flow path from a first cross-sectional area at a system piping interface to a second cross-sectional area at an interface to the measuring channel.

The foregoing description of implementations provides illustration and description, but is not intended to be exhaustive or to limit the invention to the precise form disclosed. Modifications and variations are possible in light of the above teachings or may be acquired from practice of the invention. For example, while some aspects have been described in the context of replacing an installed UME with a new UME, in other implementations, a UME as described herein may be installed in place of a mechanical or other legacy meter. As another example, references to orientation, such as "above," "below," "top," and "bottom" may be considered relative to orientations shown in the drawings and not necessarily actual orientations of installed equipment. Also, while a series of blocks have been described with regard to FIG. 13, the order of the blocks and message/operation flows may be modified in other embodiments. Further, non-dependent blocks may be performed in parallel.

Use of ordinal terms such as "first," "second," "third," etc., in the claims to modify a claim element does not by itself connote any priority, precedence, or order of one claim element over another, the temporal order in which acts of a method are performed, the temporal order in which instructions are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the articles "a," "an," and "the" are intended to include one or more items. Further, the phrase "based on" is intended to mean "based, at least in part, on" unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

With reference to the use of the words "comprise" or "comprises" or "comprising" in the foregoing description and/or in the following claims, unless the context requires otherwise, those words are used on the basis and clear understanding that they are to be interpreted inclusively, rather than exclusively, and that each of those words is to be so interpreted in construing the foregoing description and the following claims.

It is to be understood that any given elements of the disclosed embodiments of the invention may be embodied in a single structure, a single step, a single substance, or the like. Similarly, a given element of the disclosed embodiment may be embodied in multiple structures, steps, substances, or the like.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A metering assembly, comprising:
   a measuring element comprising:
      a cover including an underside cavity,
      a measuring channel, coupled to the cover, adjacent the underside cavity to form a gap between the cover and the measuring channel, the measuring channel including a seal ring secured to an inlet end of the measuring channel,
      an electronics module including at least one pair of ultrasonic transducers for measuring a flow of a fluid flowing through the measuring channel, and a processor to calculate a flow value from the pair of ultrasonic transducers, and
      an acoustic reflector,
         wherein each of the ultrasonic transducers is configured to transmit an ultrasonic signal into the measuring channel, and wherein the acoustic reflector reflects the ultrasonic signals from between the pair of ultrasonic transducers; and a main case that includes:
- a main cavity to receive at least a portion of the measuring element,
- a flange surrounding a top of the main cavity, the flange configured to support the cover,
- an entry section that transitions a flow path from a first cross-sectional area to a second cross-sectional area, and
- a machined surface adjacent the second cross-sectional area and facing the main cavity, wherein, when the measuring element is installed in the main cavity, the seal ring is configured to press against the machined surface to form a fluid-tight seal, and wherein the gap between the cover and the measuring channel is configured to release air through a bleed hole for the underside cavity.

2. The metering assembly of claim 1, wherein the cover is a cast metal.

3. The metering assembly of claim 2, wherein the measuring channel comprises a polymer material.

4. The metering assembly of claim 1, wherein the measuring channel forms a fluid path with a substantially rectangular cross-section orthogonal to the fluid path.

5. The metering assembly of claim 1, wherein the measuring channel is formed from a different material than the cover, and wherein the measuring channel is secured to a bottom surface of the cover.

6. The metering assembly of claim 1, wherein
the seal ring is configured to press against the machined surface to form a face seal around the measuring channel.

7. The metering assembly of claim 1, wherein the at least one pair of ultrasonic transducers comprises two pairs of ultrasonic transducers, wherein each pair of transducers generate parallel measurement paths.

8. The metering assembly of claim 1, wherein each of the ultrasonic transducers is configured to transmit an ultrasonic signal into the measuring channel from above the measuring channel, and wherein the acoustic reflector is mounted in a bottom surface of the measuring channel.

9. The metering assembly of claim 1, wherein the main case includes a metal casting.

10. The metering assembly of claim 1, wherein the measuring element is removably secured to the main case.

11. The metering assembly of claim 1, wherein the acoustic reflector comprises stainless steel.

12. The metering assembly of claim 1, wherein the measuring channel includes ports aligned with the at least one pair of ultrasonic transducers, wherein the ports permit the ultrasonic signal to enter and exit the measuring channel.

13. The metering assembly of claim 1, wherein the measuring channel further comprises a pocket into which the reflector is installed.

14. The metering assembly of claim 1, wherein the case is formed from sand casting, and wherein the
machined surface provides a smooth, planar surface that matches the inlet end of the measuring channel.

15. The metering assembly of claim 1, wherein the cover further comprises: a venting path configured to channel air to the bleed hole located at a high point in the cover, when the measuring element is installed and the cover is oriented above the main case.

16. A measuring element comprising:
a cover, formed from a first material, the cover including mounting holes and an underside cavity;
a measuring channel, formed from a second material that is different than the first material, the measuring channel being coupled to the cover, adjacent the underside cavity, to form a gap between the cover and the measuring channel, the measuring channel including a seal ring secured to an inlet end of the measuring channel, wherein the gap between the cover and the measuring channel is configured to release air through a bleed hole for the underside cavity;
an electronics module including:
at least one pair of ultrasonic transducers for measuring a flow of a fluid flowing through the measuring channel, and
a processor to calculate a flow value from the at least one pair of ultrasonic transducers,
wherein each of the ultrasonic transducers are configured sit in one of the mounting holes and transmit an ultrasonic signal into the measuring channel; and
an acoustic reflector mounted on an opposite side of the measuring channel from the at least one pair of ultrasonic transducers, wherein the acoustic reflector reflects the ultrasonic signals between the at least one pair of ultrasonic transducers, and
wherein the measuring element is configured to be removably attached to a main casing that is connected to a piping system.

17. The measuring element of claim 16, wherein the acoustic reflector reflects the ultrasonic signals between the at least one pair of ultrasonic transducers in a V-shaped measurement path.

18. The measuring element of claim 16, wherein the cover includes angled mounting holes, and
wherein each of the ultrasonic transducers is configured to sit in one the angled mounting holes and transmit an ultrasonic signal at an angle onto the acoustic reflector.

19. The measuring element of claim 16, wherein the measuring channel includes a substantially rectangular cross-section orthogonal to the fluid path.

20. The measuring element of claim 16, wherein the at least one pair of ultrasonic transducers includes two pairs of ultrasonic transducers, the two pairs of ultrasonic transducers configured to generate measurement paths that are parallel to each other.

* * * * *